B. C. SEATON.
PNEUMATIC TIRE.
APPLICATION FILED OCT. 20, 1920.
1,412,492.
Patented Apr. 11, 1922.
2 SHEETS—SHEET 2.
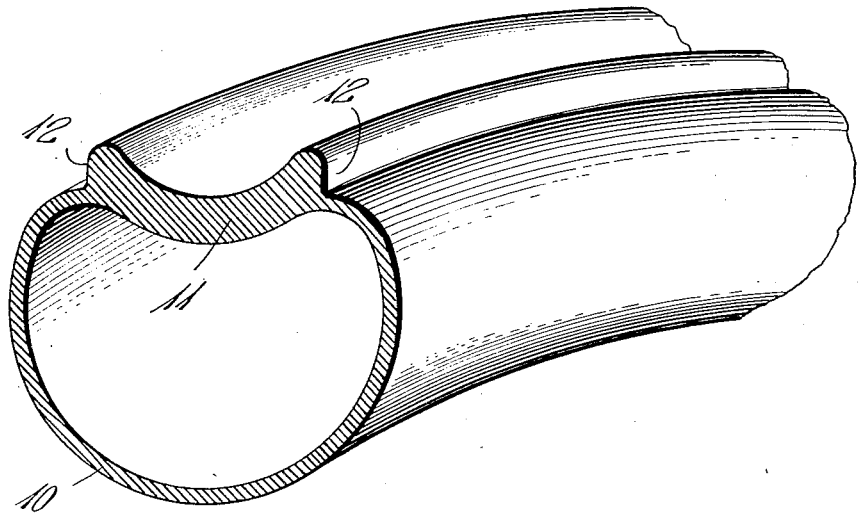
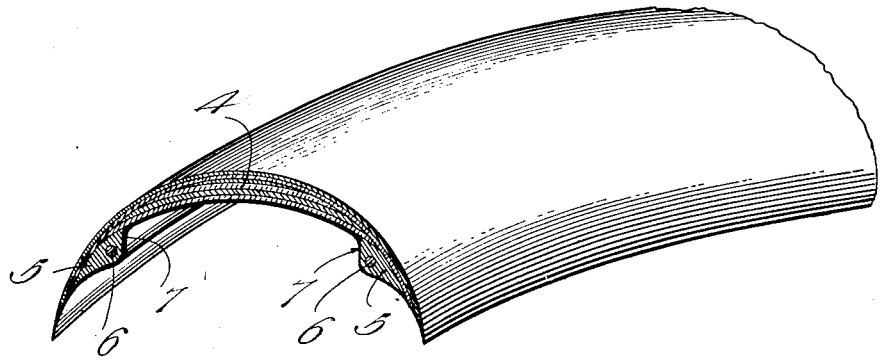
Inventor
Benjamin C. Seaton
by H. B. Willson & Co
Attorneys

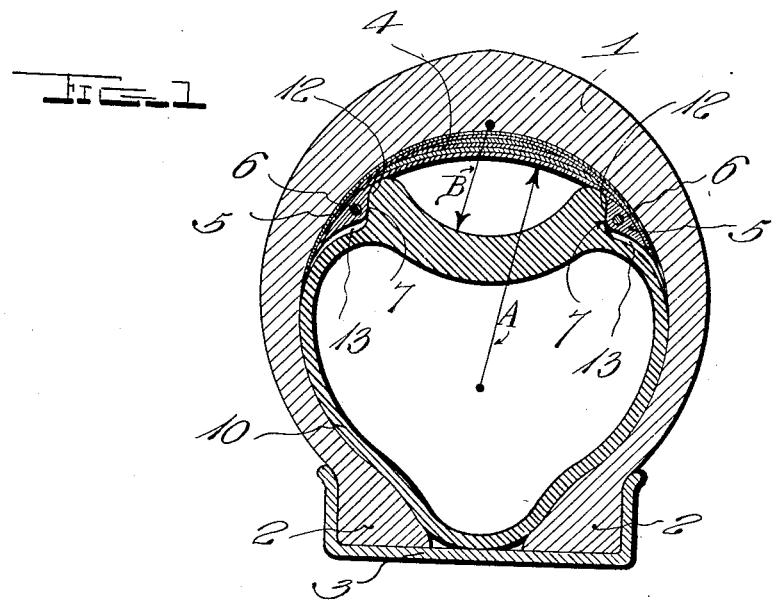
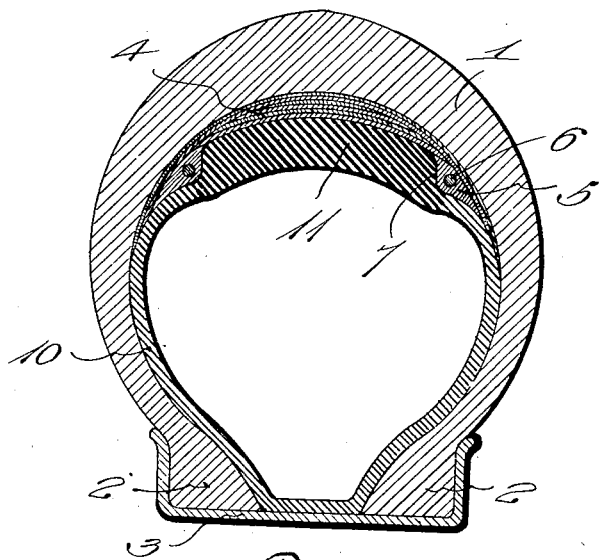

UNITED STATES PATENT OFFICE.

BENJAMIN C. SEATON, NASHVILLE, TENNESSEE.

PNEUMATIC TIRE.

1,412,492.  Specification of Letters Patent.  Patented Apr. 11, 1922.

Application filed October 20, 1920. Serial No. 418,142.

*To all whom it may concern:*

Be it known that I, BENJAMIN C. SEATON, a citizen of the United States, residing at Nashville, in the county of Davidson and State of Tennessee, have invented certain new and useful Improvements in Pneumatic Tires; and I do declare the following to be a full, clear, and exact description of the invention, such as will enable others skilled in the art to which it appertains to make and use the same.

My invention relates to pneumatic vehicle tires and more particularly to those of the type employing an inner tube provided with a compressed tread portion to effect self-sealing of punctures, the general idea being very similar to that disclosed in my pending U. S. application, Serial No. 356,427, filed February 5, 1920. The present invention however aims to generally improve on the subject matter of this pending case, and to provide a more practical construction which may be manufactured to greater advantage and can be easily adapted to tire casings of the type now on the market. These ends are attained by the novel construction and arrangement of parts hereinafter described and claimed, the descriptive matter being supplemented by the accompanying drawings.

Figure 1 is a transverse sectional view of a tire casing and tube in accordance with my invention, the tube being shown in a deflated condition.

Figure 2 is a view similar to Fig. 1 but showing the condition of parts when the tube is inflated, the tread portion of said tube being highly compressed as indicated by the heavy section lining.

Figure 3 is a sectional perspective view of the tube showing its normal shape.

Figure 4 is a sectional perspective view of a portion of the adapter which may be employed in adapting the improved tube for use in connection with casings of the type now used, or may be formed as an integral part of new casings which are constructed at the factory in accordance with the invention.

In the drawings above briefly described, the numeral 1 designates a tire casing which may be of the usual or any preferred construction, said casing having beads 2 for engagement with the rim 3 in the usual way. While no fabric or cord carcass is shown in the casing 1, it is of course understood that this carcass is used. When the casing 1 is constructed at the factory in accordance with the present invention, an integral part of said casing is formed by a liner or adapter 4, but this adapter is applicable also to tire casings of the form now in every day use, whereby such casings are converted for use in connection with the improved inner tube hereinafter described.

The adapter 4 preferably consists of several layers of fabric as shown most clearly in Fig. 4, said layers being so arranged that the adapter gradually decreases in thickness from its center to its edges, the latter being very thin and forming flaps which gradually taper the thickness of the adapter to an infinitesimal degree so that there will be no chafing of the inner tube thereby. On its inner surface, the adapter 4 is provided with a pair of circumferentially extending ribs 5 which are preferably formed of rubber reinforced by cords or the like 6. When the adapter is in place within the casing 1, the opposed faces 7 of these ribs, are positioned at substantially right angles to the rim side of the casing, which is one important change over the construction shown by the pending application above referred to. The advantages of this change will be hereinafter set forth fully.

The adapter 4 is built up on a suitable core and the casing 1 may well be formed on this same core after completing the adapter, if said adapter and casing are to be incorporated in a single integral structure. However, as above suggested, the adapters may be constructed independently of the casings and marketed in such a manner that they may be purchased by the public and cemented or otherwise secured in tire casings of the present day type.

The improved inner tube is designated by the reference character 10, said tube having a thickened tread portion 11 and a pair of circumferentially extending external shoulders 12 bordering said thickened tread portion. This portion is preferably of approximately uniform thickness throughout and is bowed inwardly throughout its circumference, said tread portion having an inherent tendency to remain in this bowed condition until it is inflated, whether the tube be removed from the casing as shown in Fig. 3 or positioned within said casing as disclosed in Fig. 1. Fig. 3 shows the normal condition of the tube and it will be observed by reference to this figure that the two shoulders 12 are in approximately parallel relation with each other, and the distance between said shoulders on a straight line is then exactly the same as the distance between the opposed surfaces 7 of the ribs 5, on a corresponding straight line. It thus follows that when the tube is inserted in the casing, its thickened tread portion 11 will be readily receivable between the ribs 5 as seen in Fig. 1, without the necessity of transversely compressing or bowing the tread portion of the tube by hand. This cannot be conveniently done unless the inner surfaces of the ribs 5 are at substantially right angles to the rim side of the casing and unless the shoulders 12 are formed as shown and described.

Attention may here be directed to the fact that the shoulders 12 are of slightly greater radial width than the inner surfaces of the ribs 5, thereby leaving a slight space 13 between the inner portions of said ribs and the adjacent portions of the tube 10. This construction is necessary in order that the tube may tightly seat against the ribs without stretching, when the tube is inflated and the thickened tread portion 11 moves outwardly into contact with the adapter 4 as shown in Fig. 2. Were it not for the spaces 13, the portions of the tube 10 at the edges of the thickened tread portion 11, would be stretched as said tread portion moves from the position of Fig. 1 to that shown in Fig. 2, and this stretching would be very undesirable since it would tend to open the pores of the rubber and cause slow leakage. Attention is here also directed to the fact that the tube 10 is of a size and shape to correctly fit the casing 1 before inflation, as will be clear from Fig. 1. It is then insured that no stretching of the tube shall take place when it is inflated and consequently none of the pores will be opened.

The surface of the adapter 4, between the ribs 5, is outwardly bowed to some extent in the present instance, whereas in my pending application, it is straight in transverse section. The radius of the transverse curvature of the surface in question however is much longer than the radius of the inward bow of the thickened tread portion 11 of the tube 10, as will be readily seen by comparing the lines A and B of Fig. 1. When the air pressure in the tube 10 forces the tread portion 11 outwardly until it stands on a straight line extending transversely of the tire, said tread portion is under maximum and substantially uniform compression. However, it is highly desirable to have greater compression on the inner surface of the tread portion of the tube, than on the outer surface thereof. Hence, I curve the inner surface of the casing tread in the manner described, and permit the air pressure to force the tread portion 11 beyond the line of uniform compression so that it will assume the position shown in Fig. 2. It thus follows that the inner portion of the tread 11 is compressed to a greater extent than the outer portion thereof and it has been found that by so doing, punctures of the tread portion 11 are more effectively sealed by the compression of the rubber.

Another advantage for the outward bowing of the inner surface of the adapter 4, is that the tread of the casing 1 may be constructed of less thickness than in my pending application, with the result that such tread will be more flexible and will yield throughout its area instead of only at its juncture with the sides of the casing. Hence, no pinching of the tube takes place and there is no tendency of the casing to crack adjacent the ribs 5. Lack of pinching is also due to a large extent, to the fact that the contacting surfaces of the ribs 5 and the shoulders 12 are disposed at substantially right angles to the rim side of the casing, instead of possessing the curvature shown in my pending application.

I have above described, the advantages for permitting the tread portion 11 of the tube to bow outwardly to some extent when the tire is inflated and have set forth the fact that the radius of the inner curved surface of the adapter 4 is longer than the radius of the inward bow of the tread portion 11, but it will be well to fully explain the reasons for these different radii. As long as they differ in the manner described, the tread portion 11 of the tube will be transversely compressed to a great extent when it is forced outwardly by air pressure to the position shown in Fig. 2, but if said radii were uniform, the tread portion would lose its compression when it reached the limit of its outward movement, with the result that the pores of the rubber would be opened. These pores are necessarily opened some by the circumferential stretch which takes place when the tread portion 11 moves outwardly under the air pressure, but by employing the construction shown or one very similar thereto, the transverse compression of the tread portion 11 more than counteracts any opening of pores effected by such circumferential stretching. The entire tread portion 11 is thus under a high state of compression or density, with the result that any punctures thereof will be immediately sealed, both before and after the device is removed, which effected the puncture.

The invention will probably be understood from the foregoing, but a brief summary may be advisable. Hence, I have below given such summary.

The adapter 4 is of great advantage in adapting casings of the present day type for use in connection with the improved tube 10 and it will be understood that said tube and adapter may be marketed independently of the casing. It is only necessary for the purchaser to cement or otherwise secure the adapter in a common form of casing, in order that he may use the improved inner tube with its puncture sealing qualities. However, in addition to marketing the invention in this way, the adapter 4 may be built in the casing at the factory and obviously the casings may be sold either with or without the tubes 10. Normally, the tube is of a size and shape to correctly fit the side and rim portion of the casing, as will be clear by reference to Figs. 1 and 3, but the space 13 exists for the purpose specified. When the tire is inflated, the air pressure therein forms the sole means for outwardly bowing the tread portion 11 of the tube and thereby places it under sufficient transverse compression to counteract any opening of the pores caused by the circumferential stretch which necessarily takes place as said tread portion moves outwardly. During this outward movement, the tube draws down flat against the inner surfaces of the ribs 5 instead of stretching as would be necessary if the spaces 13 were not provided. If desired these spaces 13 may be vented to permit the escape of air therefrom but this is not in all instances necessary. The proportion of parts is such that the thickened tread portion 11 of the tube is easily receivable between the ribs 5 without the necessity of transversely compressing or bowing said tread portion by hand and hence the tube is very easy to insert in the casing. When so inserted, the tube 10 fits said casing as will be clear from Fig. 1 so that no stretching of the rubber takes place. If desired, an ordinary inner tube may be used in the casing, in case of emergency and the ribs 5 will not chafe such tube, due to their formation.

Since probably the best results may be obtained from the details disclosed, such details may well be followed, but within the scope of the invention as claimed, numerous changes in form, proportion and minor details may be made and obviously any suitable materials may be used.

I claim:

1. In combination, a tire casing provided with a pair of opposed circumferentially extending internal ribs bordering its tread portion, an inner tube in said casing thickened throughout the width of its tread portion and having circumferentially extending external shoulders at the edges of said thickened tread portion, the greatest distance between said shoulders on a straight line and the shortest distance between said ribs on a straight line being uniform to permit easy reception of said thickened tread portion of the tube between said ribs; said thickened tread portion of the tube being transversely bowed inwardly throughout its circumference and having an inherent tendency to retain such bowed formation until the tube is inflated, whereupon said bowed tread portion is outwardly movable under air pressure to transversely compress said portion between said ribs.

2. In combination, a tire casing provided with a pair of opposed circumferentially extending internal ribs bordering its tread portion, the inner surface of said tread portion being transversely curved between said ribs, and an inner tube within said casing having a thickened tread portion provided with circumferential shoulders bearing against the inner opposed sides of said ribs, said thickened tread portion being inwardly bowed transversely throughout its circumference, the radius of said inward bow of the tread portion of the tube being considerably shorter than the radius of the transverse curvature of the tire casing between said ribs, whereby to permit said bowed tread portion to bow outwardly to a slight extent when the tube is inflated, whereby the inner side of the tube will have greater compression than the outer side.

3. A structure as specified in claim 1, said tread portion of the casing being outwardly curved on a longer radius than the bow of said bowed tread portion of the tube, whereby when said bowed portion is forced against the casing by inflation, its inner side will be placed under greater compression than its outer side.

4. A structure as specified in claim 1, the radial width of said shoulders being slightly greater than the radial width of said ribs, for the purpose specified.

5. An inner tube having its tread portion thickened and provided with a pair of outwardly facing circumferentially extending shoulders at the edges thereof, said shoulders being adapted for contact with ribs in a casing and being in substantially parallel relation with each other throughout their widths, said tread portion being inwardly bowed throughout its circumference and having an inherent tendency to retain such bowed formation until the tube is inflated.

In testimony whereof I have hereunto set my hand.

BENJAMIN C. SEATON.